E. M. Lang
Imp'd. Solder Wire Machine
112054
PATENTED FEB 21 1871
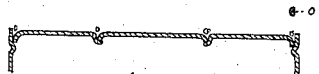
Fig. 2.
Fig. 3.
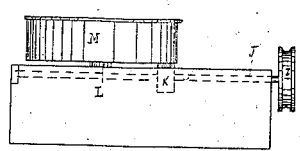
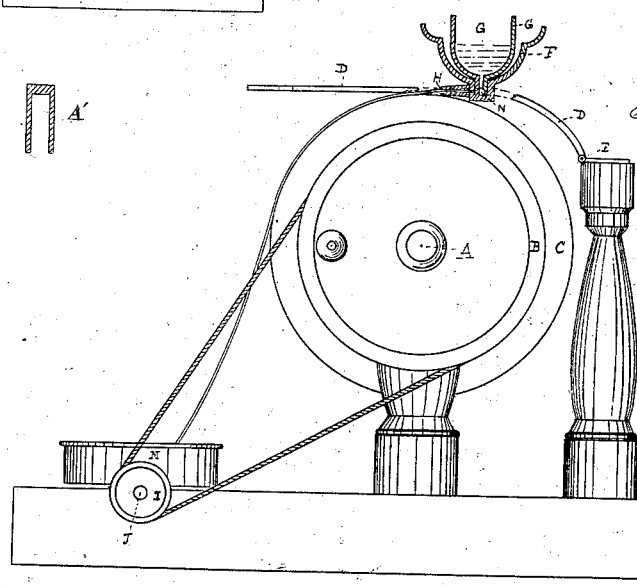
Fig. 1.
Witness
George E. Reed
Wm. Bauklin Francy
Inventors
Edward M. Lang
Per Atty. Wm. Henry Clifford

UNITED STATES PATENT OFFICE.

EDUARD M. LANG, OF PORTLAND, MAINE.

IMPROVEMENT IN CASTING SOLDER-WIRE.

Specification forming part of Letters Patent No. 112,054, dated February 21, 1871.

*To all whom it may concern:*

Be it known that I, EDUARD M. LANG, of Portland, in the county of Cumberland and State of Maine, have invented a new and useful Improved Solder-Wire Machine; and I do hereby declare the following to be a full, clear, and exact description thereof, reference being had to the accompanying drawings, in which—

Figure 1 is a side elevation. Fig. 2 is a detail of the coiling device and a section of the rim of the wheel B; and Fig. 3 is a section of the walls of a fruit-can and its cover, showing the method of using and applying the wire.

The object of my invention is a convenient method of manufacturing solder-wire.

The description shows the construction of the machine.

A is the main shaft of the machine, upon which shaft are fixed the wheels B and C. Directly over the wheel C is placed a platform, D, moving on the hinge E, being thus capable of being removed or lifted from the wheel. Attached to this platform is a furnace, F, containing a pot or crucible, G, having an opening in the bottom which terminates in the nozzle H, resting on the surface of the wheel C. The interior of the wheel C is broken out, and the rim is constructed in the manner shown at A', Fig. 2. The exterior and outer surface of this is made flat. The wheel I on the shaft J is rotated by a band from the wheel B. The shaft J is provided with a friction-roller rigidly fixed thereto, in contact with which is the tub M, which is pivoted at its center to the pivot L. The opposite side of the tub may rest upon a stationary roller or truck.

In using the machine the melted solder is placed in the crucible or pot G, in which it is held at the proper temperature by coals placed in the furnace F. The solder flows from the crucible through the nozzle H, the size of the stream being regulated by the valve N, by which the flow may be cut off or thus regulated. The shaft A being put in rotation, the solder is formed into wire by the rotation of the wheel C, which is kept at a low temperature, if required, by keeping the lower arc of the hollow rim filled with a constant stream of cold water. The wire is thus formed with a flat surface on one side, and of a shape to be seen at O, Fig. 3. The wire passes down over the wheel C into the tub M, within which it is coiled by the revolution of the tub; or a shaft, either upright or horizontal, may be substituted for the tub and the wire be coiled around the shaft spirally.

I am already the grantee of Letters Patent of the United States for a machine for casting solder in wire or sticks. This I do not now claim.

Wire has been in some cases formed by forcing the solder through holes or punctures through a metal plate, but not, as I am aware, upon the smooth surface of a rotating wheel. The flat wire produced by this device is applied with great convenience and economy, both of time and material, to the soldering of covers and studs of cans for the preservation of fruit. When the wire is designed for this purpose, it is coiled spirally upon a shaft or cylinder of a diameter nearly equal to that of the stud or cover to which it is to be applied. When the shaft is filled, a knife is drawn from end to end of the shaft. The rings of solder thus formed are placed upon the cans, as shown in Fig. 3, the flat edge of the wire being in contact with the walls of the can; or, in case of studs, in contact with the surrounding cover. The flat surface of the wire prevents the wire from slipping from place under the pressure of the soldering-iron. The inferiority of the old method of soldering cans when compared with this is easily seen. In the old method the solder, in a large stick, was held in one hand and the heated iron in the other, and the iron pressed against the solder was carried around the cover or stud. The great superiority of my method lies in the rapidity of the operation, while the old process entailed waste of solder, more frequent heating of the iron, and a less neat appearance of the cans.

What I claim as my invention, and desire to secure by Letters Patent of the United States, is—

1. The improved method of manufacturing solder-wire—viz., by the combination of the furnace F, crucible G, nozzle and valve H and N, and the wheel C, having a flat and smooth surface in rotation, substantially as herein described.

2. The winding or coiling machinery, consisting of the shaft J, the truck K, and the tub M, or equivalent, operating in conjunction with the casting apparatus, as herein described.

EDUARD M. LANG.

Witnesses:
WILLIAM HENRY CLIFFORD,
GEORGE E. BIRD.